(No Model.)
A. COCHRAN & E. C. STOVER.
FLUSHING DEVICE FOR WATER CLOSET BOWLS.
No. 475,537.                Patented May 24, 1892.
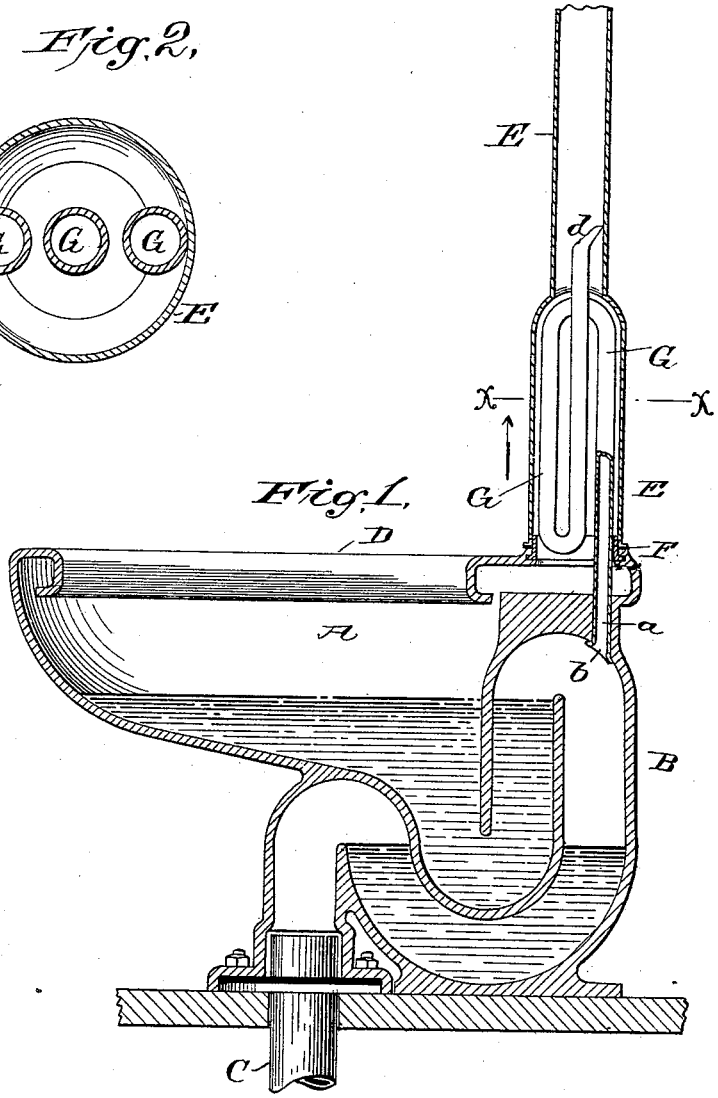

UNITED STATES PATENT OFFICE.

ANDREW COCHRAN AND EDWARD C. STOVER, OF TRENTON, NEW JERSEY.

FLUSHING DEVICE FOR WATER-CLOSET BOWLS.

SPECIFICATION forming part of Letters Patent No. 475,537, dated May 24, 1892.

Application filed August 4, 1891. Serial No. 401,643. (No model.)

*To all whom it may concern:*

Be it known that we, ANDREW COCHRAN and EDWARD C. STOVER, citizens of the United States, and residents of the city of Trenton, county of Mercer, and State of New Jersey, have invented certain new and useful Improvements in Flushing Devices for Water-Closet Bowls, of which the following is a specification.

Our invention relates to that class of water-closets in which a trap is made in the form known as a "siphon," and is preferably employed with a double siphon-trap, though applicable, if desired, to a single siphon-trap; and our invention consists in a supply or flushing pipe, which by reason of its peculiar construction will not only flow and afterflow the bowl, but will start the siphon-trap more readily and with less water than heretofore, the said pipe itself being preferably sealed by means of a trap against any backflow of sewer-gas or other noxious air or gases.

To this end our invention consists in an improved flushing device for water-closet bowls, in which the flushing-pipe is coupled to the flushing-rim of the bowl and provided with an auxiliary pipe situated within the flushing-pipe or with its upper end in said pipe, and with a projecting lower end, which enters the trap of the bowl.

In the accompanying drawings, Figure 1 is a vertical section of a two-trap-siphon water-closet provided with one form of our improved flushing-pipe, and Fig. 2 is a cross-section on line *x x* of Fig. 1.

Same letters indicate similar parts in the different figures.

A is the water-closet bowl, which may be of any desired or usual shape, terminating in the siphon-trap B, of usual and well-known make, from which leads the discharge-pipe C. The flushing-rim D of the water-closet bowl is open to the flushing or supply pipe E, which communicates with the usual flushing-tank, in which it is opened or closed by a suitable valve. The flushing-pipe is secured to the earthenware bowl by the coupling F, which may be of any well-known and suitable form, but preferably of the form shown and described in Letters Patent No. 398,838, granted to Herbert Machin March 5, 1889.

An opening *a* into the upper part of the siphon-trap B is left in the earthenware of the bowl A in casting, by means of which a small pipe projecting from the flushing-pipe E enters said trap, as hereinafter explained.

The flushing or supply pipe E is preferably sealed by means of an auxiliary trapped pipe G, the lower end of which *b* enters the siphon-trap B through the opening *a* of the earthenware, and the upper end of which pipe G is so situated within the pipe E as to receive a portion of the water descending through the pipe E, when the valve connecting the same with the flushing-tank is opened, and transmits the same directly to the siphon-trap B for the purpose of starting the siphon of said trap. The rest of the water descending through the pipe E flushes the bowl of the water-closet by means of the flushing-rim D in the ordinary manner.

The pipe G is preferably trapped, so that when the siphon action of the trap B stops or in case where a single siphon-trap is used, or in the event of the lower trap of a two-siphon trap being siphoned out the pipe G shall not serve as a vent for the escape of sewer-gas and similar noxious vapors into the supply-pipe, and thence into the room; but the pipe G may sometimes be made without any trap.

It is important that the upper opening *d* of the pipe G should be inside the pipe E and in such a position, whether central or touching one side of the pipe F, as to allow the main body of descending water to pass into the flushing-rim in the ordinary way; but it is not necessary that the trap should be inside the flushing-pipe, as shown in the drawings, although that construction we consider to be the most artistic, economical, and practical way of employing a trapped pipe, and when thus wholly inclosed within the flushing-pipe E it is preferable to have the lower portion of said pipe enlarged and the upper portion contracted instead of having the pipe of the same diameter throughout, as the latter arrangement would cause a large waste of water; but the trap may be cast in the earthenware of the bowl or entirely outside the bowl and pipe, as preferred. The height at which the pipe E is tapped by the upper opening *d* of the pipe G may be selected almost at pleasure, the important point to be considered being that it should be sufficiently high up the flushing-pipe to tap the descending water while it is still subject to the pressure of the water in the flushing-tank and before the resistance of the air in the flushing-pipe has divided the column of descending water, and hence the water received by the pipe G will descend with more effective force for starting the siphon in the trap B. The pipe G might even be extended very nearly or quite up to the point of junction of the supply-pipe with the flushing-tank; but for practical purposes an upward projection, such as shown in drawings, Fig. 1, will be sufficient to accomplish the desired objects.

It is obvious that pipe G will receive and transmit water to the siphon-trap B only when the quantity and pressure of the water descending through the pipe E are sufficient substantially to fill the horizontal area of said pipe E, and therefore water simply following the surface of said pipe E, except a small portion, which is caught by the projecting rim of the opening $d$, will simply afterflow the bowl through the flushing-rim in the usual manner as if the pipe G were not present. Thus it is obvious that by so constructing or operating the flushing-tank and its valves a full supply of water is first sent down pipe E and afterward a diminished supply the bowl will be flushed and the trap B siphoned out by the action of the first or full supply, and the bowl will be afterflowed and the three traps sealed by the second or less supply.

We claim—

1. An improved flushing device for water-closet bowls, which consists of a flushing-pipe connecting the flushing-tank with the flushing-rim of the bowl, and a second or auxiliary pipe the upper end of which is set inside the flushing-pipe and taps the water descending therein and conveys a portion thereof to the siphon-trap of the bowl, into which the lower end of said auxiliary pipe enters, substantially as shown and described.

2. An improved flushing device for water-closet bowls, which consists of a flushing-pipe connecting the flushing-tank with the flushing-rim of the bowl, and a second or auxiliary trapped pipe the upper end of which is set inside the flushing-pipe and taps the water descending therein and conveys a portion thereof to the siphon-trap of the bowl, into which the lower end of said auxiliary pipe enters, and devices for resealing said auxiliary trapped pipe, substantially as shown and described.

3. An improved flushing device for water-closet bowls, which consists of a flushing-pipe connecting the flushing-tank with the flushing-rim of the bowl and containing an auxiliary trapped pipe situated within the flushing-pipe and with its lower end projecting therefrom into the trap of the bowl, substantially as shown and described.

ANDREW COCHRAN.
EDWARD C. STOVER.

Witnesses:
FRANK A. PADDOCK,
JOSEPH A. SCOTT.